3,403,132
PROCESS OF PREPARING COPOLYESTERS

Richard C. Waller, Cuyahoga Falls, Ohio, assignor to The Goodyear Tire & Rubber Company, Akron, Ohio, a corporation of Ohio
No Drawing. Filed June 21, 1957, Ser. No. 667,269
1 Claim. (Cl. 260—47)

This invention relates to linear condensation polyesters and more particularly to linear condensation copolyesters.

One object of the invention is to provide copolyesters which can be made into films and coatings of exceptional clarity. Another object is to provide self-supporting films of outstanding toughness, impact resistance and tear-resistance. Another object is to provide copolyesters which can be formed into fibers having excellent properties. Another object is to provide copolyesters having outstanding solubility characteristics. Another object is to provide copolyesters having outstanding electrical characteristics. Another object is to provide copolyesters which can be converted into tough, transparent molded products. Another object is to provide copolyesters having outstanding abrasion resistance. Another object is to provide copolyesters having desirable combinations of properties not possessed by polyesters in general. Other objects and advantages of the invention will be apparent as the description proceeds.

One linear superpolyester which has been developed in a commercial scale is polymeric ethylene terephthalate. This material has many excellent properties but it also has certain limitations. It has a pronounced tendency to crystallize to a high degree of crystallinity and has a rapid rate of crystallization. This makes it difficult to obtain it in amorphous form, the production of film being more difficult than fiber and particular difficulty being encountered with relatively thick or massive products. This is also affects the processing of the resin, even when crystalline products are being made. Oriented products of polymeric ethylene terephthalate, such as fibers and films, have a high degree of crystallinity and rigidity and, while this is desirable for some purposes, it is undesirable for other purposes, e.g., where it is desired to wrap an article in film of fabric and shrink the film or fabric by warming it to produce a tight, smooth covering. Polymeric ethylene terephthalate is also extremely insoluble in most solvents, especially those of practical commercial value, and thus, does not readily lend itself to use in solution for solution coating, dipping and the like.

Efforts to overcome particular disadvantages of ethylene terephthalate have previously been made by preparing specific copolyesters.

Of the specific copolyesters previously prepared, ethylene terephthalate-isophthalate has exhibited outstanding properties. Ethylene terephthalate-isophthalate copolyesters are described in Milone, Shaffer and Leutner application Serial No. 413,722, filed March 2, 1954. The copolyesters of the present invention are even better than ethylene terphthalate-isophthalate in important respects, e.g., in toughness, softening point, heat stability, dielectric strength and solubility.

By the present invention, a new specific type of copolyester has been discovered, with specific properties and with a combination of properties which make these copolyesters better for some purposes and, in addition, useful for certain purposes for which other copolyesters are not suitable.

The copolyesters of this invention are high molecular weight linear random copolyesters of terphthalic acid, ethylene glycol and 2,2-bis [4-($\beta$-hydroxyethoxy) phenyl] propane. The copolyesters can be prepared by an ester-interchange and condensation reaction between bis-$\beta$-hydroxyethyl terephthalate and 2,2-bis[4-($\beta$-hydroxyethoxy) phenyl] propane.

The starting materials bis-$\beta$-hydroxyethyl terephthalate and 2,2-bis[4-($\beta$ - hydroxyethoxy)phenyl propane] are readily prepared according to known methods. If the bis-$\beta$-hydroxyethyl terephthalate be prepared by reaction of ethylene glycol with dimethyl terephthalate, splitting out methyl alcohol, a known method, some glycol can split out to produce, by condensation, some low polymeric ethylene terephthalate. Such low polymers, or mixtures thereof with bis-$\beta$-hydroxyethyl terephthalate can be used in place of pure monomeric bis-$\beta$-hydroxyethyl terephthalate.

The mechanism of formation of the copolymers of the invention may be illustrated as follows:

One mol of 2,2-bis[4-($\beta$-hydroxyethoxy)phenyl] propane can be reacted with one mol of bis-$\beta$-hydroxyethyl terephthalate, splitting off ethylene glycol, as follows:

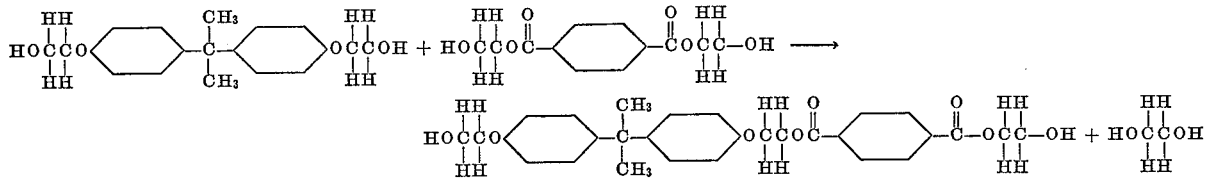

The resultant terephthalate can then be reacted with another mol of 2,2-bis[4-($\beta$-hydroxyethoxy)phenyl] propane, or, alternatively with another mol of bis-($\beta$-hydroxyethyl) terephthalate.

Also, as previously noted, bis($\beta$-hydroxyethyl) terephthalate condenses with itself to form polymeric ethylene terephthalate. This can react with 2,2-bis [4-($\beta$-hydroxyethoxy)phenyl] propane or the reaction products noted above.

As the condensation proceeds, ester-ester interchange can take place between the polymer molecules.

As the result of such complex reactions, copolymers are formed containing, in random arrangement, the following repeating units:

(A)

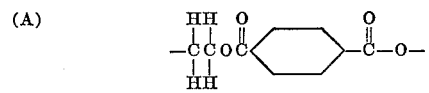

and (B)

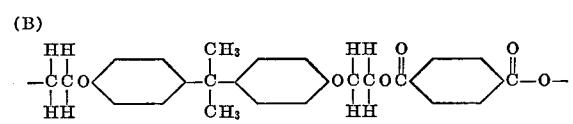

The ratio of these repeating units in the copolyester product is controlled by the ratio of bis($\beta$-hydroxyethyl) terephthalate and 2,2 - bis[4 - ($\beta$-hydroxyethoxy)phenyl] propane employed, i.e., by the amount of 2,2-bis[4-($\beta$-hydroxyethoxy)phenyl]propane used to replace ethylene glycol in the bis($\beta$-hydroxyethyl) terephthalate. Thus, if it is desired to make a copolyester containing 60% of (A) units and 40% of (B) units, 40 mol percent of 2,2 - bis[4 - ($\beta$-hydroxyethoxy)phenyl]propane, based on the bis($\beta$-hydroxyethyl) terephthalate, is used, i.e., 40 mols of 2,2 - bis[4 - (β-hydroxyethoxy)phenyl]propane would be reacted with 100 mols of bis(β-hydroxyethyl) terephthalate. For convenience, the copolyesters of the invention can be referred to as E/BT, the E referring to ethylene residues, the B referring to 2,2-bis[4-(β-hydroxyethoxy)phenyl]propane residues and the T referring to the terephthalic acid residues. Thus, the above copolyester will be identified as 60/40 E/BT. Correspondingly, a copolyester containing 80 percent of (A) units and 20 percent of (B) units is referred to as 80/20 E/BT.

The copolyesters of the invention are those which contain from 90 to 30% of (A) units and correspondingly from 10 to 70% of (B) units, i.e., from 90/10 E/BT to 30/70 E/BT. The 90/10 E/BT and 85/15 E/BT polymers crystallize readily but at such a rate that they are easily obtained in the amorphous state by quenching the hot, molten resin. The 80/20, 75/25 and 70/30 copolyesters crystallize with increasing difficulty. The compositions from 60/40 E/BT to 30/70 E/BT have not yet been crystallized and appear to be non-crystallizable.

Compositions containing 20% or less of ethylene terephthalate, (A) units, crystallize to produce materials having the following representative melting points:

| E/BT composition: | Melting point, °C |
| --- | --- |
| 20/80 | 82–86 |
| 5/95 | 87–89 |
| 0/100 | 92.5–93.5 |

The copolymers of the invention can be prepared by the following representative procedure:

Bis-β-hydroxyethyl terephthalate is prepared by charging a molten mixture of 6800 grams of dimethyl terephthalate and 5000 grams of premium grade ethylene glycol (15% excess) into a 12 liter flask equipped with a heating mantle, fractionating column, nitrogen inlet tube and stirrer. Ester interchange catalysts (0.03% zinc acetate and 0.0051% manganese acetate, based on the weight of dimethyl terephthalate) are added at a temperature of 140° C. The temperature is slowly raised, and a slow stream of nitrogen is bubbled through the melt to help sweep out the methanol evolved. The column is cooled with compressed air and conditions are adjusted so that the temperature at the top of the column remains below 70° C. As methanol is evolved, the temperature of the pot slowly rises until it reaches 200° C., at which point the heat input is reduced to hold the temperature constant. The reaction is essentially complete after the pot temperature has been held at 200° C. for about 45 minutes.

Weighed portions of the glycol terephthalate ester thus prepared and 2,2 - bis[4 - (β-hydroxyethoxy)phenyl]propane totaling 3600 grams are melted down in a 5-liter flask, the proportions of the two materials being adjusted to prepare specific copolyesters having various ratios of (A) and (B) units, as defined above, the 2,2-bis[4-(β-hydroxyethoxy)phenyl]propane being used in the amount of from 10 to 70 mols per 100 mols of bis-β-hydroxyethyl terephthalate to prepare polymers ranging from 90/10 E/BT to 30/70 E/BT. Thus, for a 60/40 E/BT polymer, 2459 grams of the glycol terephthalate and 1141 grams of 2,2-bis[4-(β-hydroxyethoxy)phenyl]propane are used. The reactor is evacuated and filled, i.e., brought back to atmospheric pressure, with "lamp grade" nitrogen. The molten mixture is then charged through a long conical funnel fitted with a fine mesh stainless steel screen into a round-bottomed cylindrical reactor about 10 inches high and having an inside diameter of about 6 inches, equipped with a close clearance wall scraping type of stirrer or agitator. A polymerization catalyst, ethylene glycol titanate (prepared, for example, according to Example 1 of copending application, Serial No. 596,419, filed July 9, 1956, by A. Piirma) in the amount of 0.0022% by weight, based on the combined weight of the glycol terephthalate and the 2,2-bis[4-(β-hydroxyethoxy)phenyl]propane, is placed in the charging funnel beneath the screen so that it will be carried into the reactor by the molten charge. Agitator speed is set at about 100 r.p.m. and heat is supplied and the pressure is slowly reduced. Minimum pressure (about 0.5 millimeter of mercury) and maximum temperature (275–280° C.) are reached in approximately 1.5 hours. As the viscosity of the mixture increases, the agitation speed is reduced until a speed of about 46 r.p.m. is obtained. The polymer is discharged from the reactor when it reaches an intrinsic viscosity of about 0.65 to 0.70.

In general, the conditions and techniques employed are similar to those employed in making other linear condensation superpolyesters. Thus, as indicated above, it is desirable to carry out the ester interchange and condensation reactions in the presence of suitable catalysts in order to secure a satisfactory degree of reaction in a reasonable time. Various examples of ester interchange and condensation catalysts for use in such reactions are well known.

The agitator speeds shown in the illustrative example are not critical, and the type and degree of agitation will depend upon the particular apparatus employed.

In order to have good physical properties, the copolyesters should have a high molecular weight, i.e., they should have an intrinsic viscosity of at least 0.4 and preferably at least 0.5. In usual practice the intrinsic viscosity will be between 0.5 and 0.8.

The term intrinsic viscosity, represented by the symbol $[\eta]$, is used herein as a measure of the degree of polymerization of the copolyester. It is defined by the Billmeyer equation as follows:

$$[\eta] = \tfrac{3}{4} \frac{\ln \eta_r}{C} + \tfrac{1}{4} \frac{\eta_{sp}}{C}$$

wherein $\eta_r$ is the viscosity of the dilute 60/40 phenol/tetrachloroethane mixed solvent solution of the copolyester divided by the viscosity of the 60/40 phenol/tetrachloroethane mixed solvent itself measured under the same conditions as the copolyester solution; $\eta_{sp} = \eta_r - 1$, where $\eta_r$ is as defined above; and C is the concentration of the copolyester in grams per 100 cubic centimeters of solution.

The copolyesters of this invention have unusually high melt viscosities in relation to their intrinsic viscosities. They also have relatively high softening points in comparison with other related copolyesters. Thus, in comparative tests, representative copolyesters of the present invention had softening points about 12–15° C. higher than ethylene terephthalate-isophthalate copolyesters of comparable composition. The copolyesters of the invention have good flexibility at low temperatures. They have outstanding abrasion resistance. For example, in the U.S. Bureau of Standards Abrasion Test, in which the standard sample has an index of 100 and anything over 100 is considered to be very good, a 20/80 E/BT copolymer had an abrasion index of 331.5 and tore up the sandpaper. The copolyesters of the invention also have very good heat stability, the heat stability being better than that of polymeric ethylene terephthalate-isophthalate. Self-supporting films made from the copolyesters of the invention are tough and have a high tear resistance and resistance to rupture on impact. The copolyesters of the invention have exceptionally good dielectric properties. Thus, an extruded, amorphous, unoriented 60/40 E/BT film about 10 mils thick had a dielectric strength of about 3000 volts per mil. (Tests on E/BT films of varying composition have shown good dielectric strengths across the range of composition from 90/10 E/BT to 30/70 E/BT.) A comparable 60/40 ethylene terephthalate/isophthalate film about 7 mils thick had a dielectric strength of about 500 volts per mil. (Values for thinner films are generally higher than for thicker films.) An oriented, crystalline film of polymeric ethylene terephthalate about 8–9 mils thick had a value of about 1500 volts per mil. (In general, oriented, crystalline films have higher dielectric strengths than unoriented, amorphous films of the same composition.) A commercial vinyl resin film (about 10 mils thick) used for insulating tape had a dielectric strength of about 1200 volts per mil. The products of the invention also have other outstanding and useful properties.

Films are made from the copolyesters of the invention by techniques similar to those employed with other linear condensation polymers such as polyesters. Thus, for example, films may be made by extrusion of the molten polymer or by casting film from a solution of the copolyester. Films so made can be oriented in one or more directions by "cold-drawing." For some purposes, it is desirable to subject the film to biaxial or planar orientation, e.g., by stretching the film in two directions at right angles to each other. Very useful amorphous films, which can be oriented or unoriented, as desired, can be made from copolyesters over the entire range of composition from 90/10 E/BT to 30/70 E/BT. When compositions which crystallize are employed for amorphous films, melt-extruded films should be quenched to prevent crystallization. If compositions in the non-crystallizable range are employed, quenching is not necessary. The latter are particularly desirable for some purposes, since they will not crystallize in use, even if exposed to heat. Amorphous, unoriented films will usually be made from copolyesters in the range from 70/30 E/BT to 30/70 E/BT. The preferred range is from 70/30 E/BT to 50/50 E/BT. For some purposes, it is desirable to make film from crystallizable copolyesters. Crystallizability is essential when the films are to be oriented and "heat-set." Such films are made from copolyesters in the range from 90/10 E/BT to 70/30 E/BT, the preferred range being from 85/15 E/BT to 75/25 E/BT.

The films of this invention have higher tear strength and resistance to impact than films of polymeric ethylene terephthalate-isophthalate and have the feel of plasticized films in contrast to the hard feel of ethylene terephthalate-isophthalate films or cellophane. They have good flexibility at low temperatures.

Fibers can be made from the entire range of copolyesters and, if desired, can be oriented by "cold-drawing." In fibers, it is usually desirable to have crystalline structure and, therefore, the preferred fibers are made from copolyesters in the range from 90/10 E/BT to 70/30 E/BT and more particularly from 90/10 E/BT to 85/15 E/BT. The fibers can be made by melt extrusion with apparatus and by methods employed to make fibers from other linear condensation polymers. When crystallizable polymers are employed, the cold drawn fibers can be "heat-set," if desired.

All of the copolyesters of the invention are much more soluble than polymeric ethylene terephthalate and the preferred materials for solution work are more soluble and their solutions have better "shelf-life" than ethylene terephthalate-isophthalate copolyesters of comparable composition. The compositions from 50/50 E/BT to 30/70 E/BT have better solubility than those having a higher content of ethylene terephthalate units and the most preferred range for solution work is from 40/60 E/BT to 30/70 E/BT. Various organic solvents can be used. Representative examples are cyclohexanone, dioxane, tetrahydrofuran, o-dichlorbenzene, ethylene dichloride and trichloroethane. Mixed solvents can also be used, such as a mixture of dioxane and toluene.

Among other purposes for which the copolyesters of the invention are useful are protective coatings for wood, metal, plastics, etc.; heat-sealable coatings for aluminum foil, paper, cellophane, polymeric ethylene terephthalate film, etc.; electrical coatings for tools, wires, instruments, capacitors, etc.; ink bases; base films for pressure sensitive tape, magnetic tape or electrical tape; laminating film for laminating various materials such as wood, paper, glass, etc.; and injection and compression molded articles.

While certain representative embodiments and details have been shown for the purpose of illustrating the invention, it will be apparent to those skilled in this art that various changes and modifications may be made therein without departing from the spirit or scope of the invention.

I claim:
1. A method of making a copolyester which comprises reacting, with the elimination of ethylene glycol, a mixture of 100 mols of bis($\beta$-hydroxyethyl)terephthalate and from 10 to 70 mols of 2,2-bis [4-($\beta$-hydroxyethoxy)-phenyl] propane.

References Cited
UNITED STATES PATENTS

| | | | |
|---|---|---|---|
| 2,634,251 | 4/1953 | Kass | 260—47 |
| 2,807,606 | 9/1957 | Lincoln | 260—47 |
| 2,497,376 | 2/1950 | Swallow et al. | 260—75 |
| 2,708,617 | 5/1955 | Magat et al. | 260—47 |
| 2,762,789 | 9/1956 | Fisher et al. | 260—47 |
| 2,973,339 | 2/1961 | Muenster et al. | 260—47 |
| 2,626,939 | 1/1953 | Hoogsteen et al. | 260—47 |

FOREIGN PATENTS

| | | |
|---|---|---|
| 678,264 | 9/1952 | Great Britain. |
| 761,064 | 11/1956 | Great Britain. |

WILLIAM SHORT, *Primary Examiner.*

L. P. QUAST, *Assistant Examiner.*